UNITED STATES PATENT OFFICE.

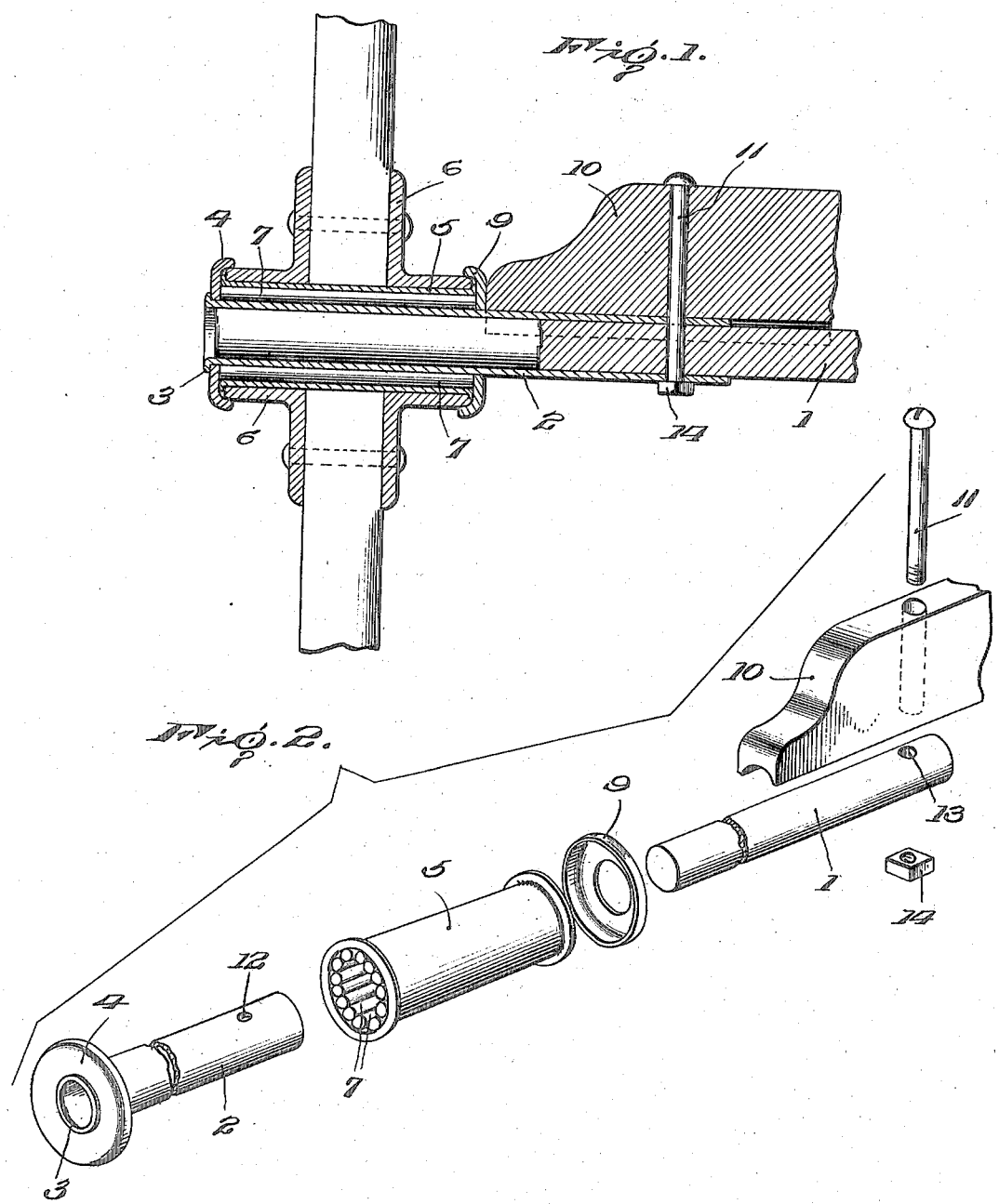

MITCHELL E. SEAMAN, OF STILLWATER, NEW YORK.

HUB-ATTACHING DEVICE.

1,249,676.

Specification of Letters Patent. Patented Dec. 11, 1917.

Application filed May 1, 1917. Serial No. 165,723.

*To all whom it may concern:*

Be it known that I, MITCHELL E. SEAMAN, a citizen of the United States, residing at Stillwater, in the county of Saratoga and State of New York, have invented certain new and useful Improvements in Hub-Attaching Devices, of which the following is a specification.

This invention relates to improvements in means for locking a wheel to the axle of a baby carriage, toy wagon, or a like vehicle.

When vehicles, such as mentioned, are placed upon the market, the wheels are usually retained on the axles by nuts or cotter pins, with the result that the juvenile will, in ordinary cases, attempt to remove the nuts or the cotter pins and take the wheels off. It follows, in time, that the vehicle is, through misuse, put out of service.

The object of my invention is to provide a construction which will effectually hold the wheels on the axles, and at the same time will not be such as will permit of the removal of the wheels, unless a person is thoroughly familiar with the mechanical arrangement of the parts.

Another object of the invention is to provide means for mounting the wheels and locking same on the axles, and at the same time, and by the same locking means, secure the wooden bolster to the axle.

With these and other objects in view, the invention comprehends improvements in the details of construction and arrangement of parts which will be hereinafter described and particularly pointed out in the claim.

In the accompanying drawing:

Figure 1 is a vertical section of my improvement illustrating a wheel mounted on and locked to its axle.

Fig. 2 is a perspective view of the parts separated.

1 indicates a metal axle, and mounted on the end of same is a sleeve 2, the outer end of which is flanged, as at 3, to retain on the end of said sleeve an outer cup shaped collar 4. Rotatably mounted on the sleeve is a wheel 6, the hub of which comprises a central cylindrical sleeve 5, and two flanged sections 6—6, the latter being riveted to the spokes in the usual manner. Interposed between the sleeve 2, and the hub sleeve 6, are elongated roller bearings 7.

On the sleeve 2, and bearing against the inner end of the hub, is a cup shaped flange 9, similar to the flange 4.

Fitted on the top of the sleeve 2, and axle 1, is the usual wooden bolster 10, the outer end thereof engaging, and thereby confining the cup shaped flange 9 in close contact with the inner end of the hub. A bolt 11 is passed through the bolster, and through alined perforations 12 and 13 in the sleeve 2, and the axle 1; and a nut 14 is screwed on the lower end. Obviously the purpose of the bolt is twofold, to wit: it secures the bolster to the axle, and it serves to lock the wheel on the axle.

In use, the parts are assembled on the axle, and then the bolt 11 is passed through the bolster and axle, as described, with the result that the wheel is effectually locked in place and cannot be removed without removing the bolt, which of course involves the separation of the axle.

From the construction described it is obvious that the wheel is confined between the two cup shaped flanges, and the end of the bolster acts as a means for holding the flanges in relation between the ends of the hubs, and that the wheel and bolster structure are secured by a single bolt.

In removing the wheel from the axle, the bolt 11 is withdrawn, then the sleeve 2 can be moved outwardly on the axle, and the inner cup shaped flange can be removed from the hub and the wheel subsequently removed.

The structure shown and described is simple, and is such as will effectually hold the wheel on the axle.

What I claim is:—

In a vehicle, the combination of a bolster formed on its underside with a groove, a sleeve seated in the groove and extending beyond the end of the bolster, an axle extending through the sleeve, a bolt passing through the axle sleeve and bolster to fasten the parts together, a wheel having a roller bearing hub mounted on the sleeve, a loose washer having an annular flange, said flange engaging over the inner end of the hub and the washer being interposed between the hub and the end of the bolster, and a loose washer on the outer end of the sleeve and having an annular flange which fits over the outer end of the hub, the outer end of the sleeve being flanged to retain the washers and the wheel on the sleeve.

In testimony whereof I affix my signature in the presence of two witnesses.

MITCHELL E. SEAMAN.

Witnesses:
J. LAURENCE PORTER,
JOSEPH W. THEADO.